March 31, 1936.    R. V. MORSE    2,035,614
CONTROL MEANS FOR BRAKES
Original Filed June 23, 1931
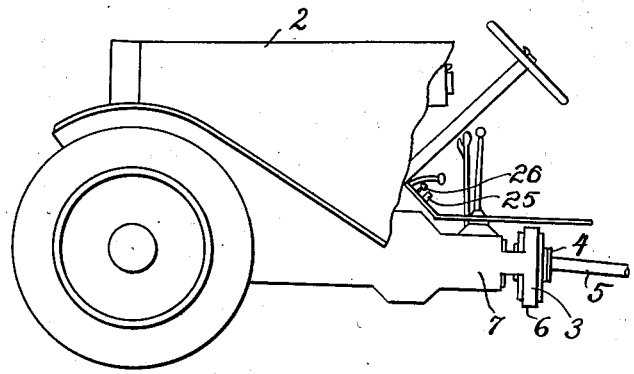
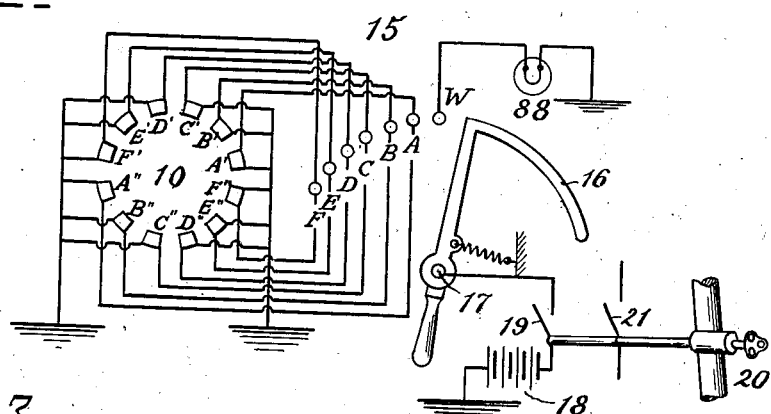
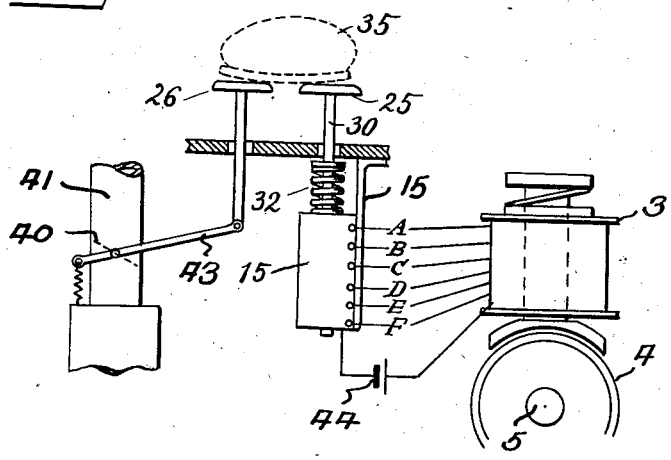
INVENTOR.
Robt V. Morse Patented Mar. 31, 1936

2,035,614

UNITED STATES PATENT OFFICE 2,035,614

CONTROL MEANS FOR BRAKES

Robert V. Morse, New York, N. Y.

Original application June 23, 1931, Serial No. 546,211. Divided and this application June 1, 1932, Serial No. 614,657

2 Claims. (Cl. 192—2)

This invention relates to brakes such as used on automobiles, and is particularly directed to the means for controlling such brakes. This is a division of application Ser. No. 546,211, for Electric brake, filed June 23, 1931 by Robert V. Morse, now Patent No. 1,960,915, issued May 29, 1934, wherein a typical and improved form of electro-dynamic brake is illustrated. In general this invention has for its primary object the improvement of the control of the road speed of automobiles, so that the driver may have instantly under his control both the acceleration and deceleration of the vehicle, with a minimum of physical effort and a minimum of psychological or muscular time lag. This has been increasingly important with the advent of ordinary touring speeds in the order of 75 feet per second, (50 miles per hour). Another object has been to accomplish the desired result with as little change in the normal acquired driving habits of the operator as possible. Another object is to combine in a single element the usual accelerator foot rest and a brake control pedal, and place the same so closely adjacent the accelerator pedal that the foot pressure can instantly shift from one to the other. While the invention is shown applied to an electric brake, as a preferred form, the features herein claimed are of general application to all forms of brakes capable of being operated by a short pedal travel controlling any form of power brake, whether it be electric, pneumatic, mechanical-servo, or hydraulic, as will be apparent to those skilled in the art. Various other objects will become apparent as the description proceeds.

Referring now to the drawing:—

Fig. 1 is a side elevation of a typical installation, showing an automobile equipped with an electro-dynamic brake, and suitable hand and foot control levers.

Fig. 2 is a diagrammatic view of a typical wiring of an electric brake control system.

Fig. 3 illustrates the manner of mounting the brake control switch or pedal, with which this invention is particularly concerned.

Referring first to Fig. 1, the automobile 2 is shown provided with a typical form of electrodynamic brake 3, such as described for example in the Patent No. 1,960,915, above mentioned. Such brakes consist in general of an armature 4 rotating with the drive shaft 5, and a field structure 6 generally supported on the rear end of the transmission gear box 7, so as to be held in alignment with the shaft from the transmission which carries the armature. The field structure 6 usually has a number of poles 10,—which are shown more in detail in Fig. 2,—and the strength of the braking force is regulated by varying the strength of the field. By varying the strength of the field the strength of the currents generated in the armature is varied, and the product of the armature currents and field magnetization gives the resisting torque or braking effect. The strength of the field is usually varied by a rheostat in the field circuit, or in the preferred form of the application above mentioned, by successively cutting in or out various poles 10,—that is, varying the number in action. In either case a controller 15, having a number of different contact points, is required.

Such a controller 15 is shown diagrammatically in Fig. 2, in which the field poles 10 are shown divided into six pairs, marked A'—A", B'—B", C'—C", D'—D", E'—E", F'—F", which are electrically connected to corresponding contacts at the controller 15 marked A, B, C, D, E, F. The controller 15 is shown diagrammatically as a segment 16 pivoted at 17, which may be moved over the contacts A, B, C, D, E, F to successively throw them in circuit with the battery 18, and thus energize the field poles in varying degrees to vary the braking effect.

The circuit is also controlled by a master switch 19, which, thru a coincidental lock 20 is also connected to operate with the ignition switch 21. A lamp 88, operating from a contact W may also be used to guard against having the brake current on when the car is standing still. The switch mechanism 15 shown is merely illustrative, and any other regulator having a series of contacts may be used, as will be evident to those skilled in the art.

In Figure 3 the brake mechanism 3 and the throttle or accelerator valve mechanism 40 of an automobile are indicated diagrammatically in a conventional manner to illustrate the relationship of the accelerator pedal 26 and brake pedal 25 with which the present patent is concerned. In Figure 3 the intake pipe 41 of the motor which is shown provided with the valve 40, as is commonly found in automobile engines, this valve 40 being operated by the accelerator pedal 26 through any suitable linkage 43, the details of the linkage and valve being immaterial so far as the present invention is concerned, and varying in different cars. The particular form of brake 3 is also immaterial, so far as the present invention is concerned, so long as it is power operated so as to be capable of control in a short range of motion by the brake control pedal 25, the brake mechanism 3 being shown conventionally in Figure 3, for purposes of diagrammatic illustration as a magnetically operated unit operating on the brake drum 4 mounted on the drive shaft 5, and energized by a source of power 44. The controller 15 is arranged to give increasing degrees of braking force as the pedal 25 is depressed, so that the general operation of the brake itself, so far as the operator is concerned, is the same as any ordinary braking system, which may be used instead, as will be evident to those skilled in the art.

The present invention is particularly directed to a method of mounting the brake pedal 25 and the accelerator pedal 26 so as to obtain improved convenience of operation and greater promptness and certainty of action.

Referring now to Fig. 1 and Fig. 3,—especially the latter,—the brake controller 15 is shown operated by depression of a pedal 25 placed so closely adjacent to the accelerator pedal 26 as to act as a footrest for the accelerator pedal 26. In other words, the footrest 25 of the accelerator pedal 26 is used as an operating element for the electric brake controller 15. This is accomplished in the following manner:—

The pedal 25 actuates a rod 30 extending into the brake controller box 15 to energize the circuits A, B, C, D, E, F as described,—this plunger rod 30 operating against a spring 32 which is heavier than the usual spring on the accelerator pedal 26, so that under ordinary conditions the operator's foot 35 may rest on the pedal 25 without depressing it and so may use the pedal 25 as a footrest to steady his foot in operating the pedal 26.

To accelerate the car, the operator tilts his foot and depresses the accelerator in the usual manner. When he desires to apply the electric brake, he merely tilts it the other way, or shifts his foot slightly so as to release the accelerator 26 and depress the pedal 25. While the brake pedal 25 has a stiffer spring than the accelerator, yet it is not so stiff as to require any great effort to depress it, and the effort required is less than that required by the ordinary brake pedal. Thus not only is much less muscular force required, but also the brakes can be applied with the utmost promptness and ease, increasing the safety in driving and the facility of control of the car.

While I have in the foregoing described certain specific examples, it will be understood that they are merely for purposes of illustration to make clear the principles of the invention, which is not limited to the particular form shown, and is susceptible to various modifications and adaptations in different installations as will be apparent to those skilled in the art without departing from the scope of the invention as stated in the following claims.

I claim:

1. In a braking system for automobiles, the combination of an accelerator pedal adapted to be pushed downward, a brake, a controller for said brake, and a pedal adapted to be pushed downward operating said controller, said last mentioned pedal having a stiffer resistance than the accelerator pedal and being arranged closely adjacent to said accelerator pedal so as to form a foot rest for said accelerator pedal, the two pedals being placed sufficiently closely side by side so that both may be operated by the toe of the operator without displacing his heel and the accelerator pedal may be operated by pushing down one side of his foot while the other side rests on the brake controller pedal, whereby an automobile may be accelerated or decelerated with slight change in position of the foot, the foot of the operator resting simultaneously on both said foot rest and accelerator pedal, so that the brake may be applied by tilting the foot one way and the accelerator may be applied by tilting the foot the other way.

2. In a braking system for automobiles, the combination of an accelerator pedal adapted to be pushed downward, a brake, a controller for said brake, and a pedal adapted to be pushed downward operating said controller, said last mentioned pedal having a stiffer resistance than the accelerator pedal and being arranged closely adjacent on the right hand side of said accelerator pedal so as to form a foot rest for said accelerator pedal, the two pedals being placed sufficiently closely side by side so that both may be operated by the toe of the operator without displacing his heel and the accelerator pedal may be operated by pushing down the left side of his right foot while the other side rests on the brake controller pedal, the foot of the operator resting simultaneously on both said foot rest and accelerator pedal, so that the brake may be applied by tilting the foot one way and the accelerator may be applied by tilting the foot the other way, whereby an automobile may be accelerated or decelerated with slight change in position of the foot.

ROBERT V. MORSE.